Oct. 20, 1942.　　　A. S. THARP　　　2,299,360
SHUT-OFF VALVE FOR STORAGE TANKS
Filed Feb. 10, 1941
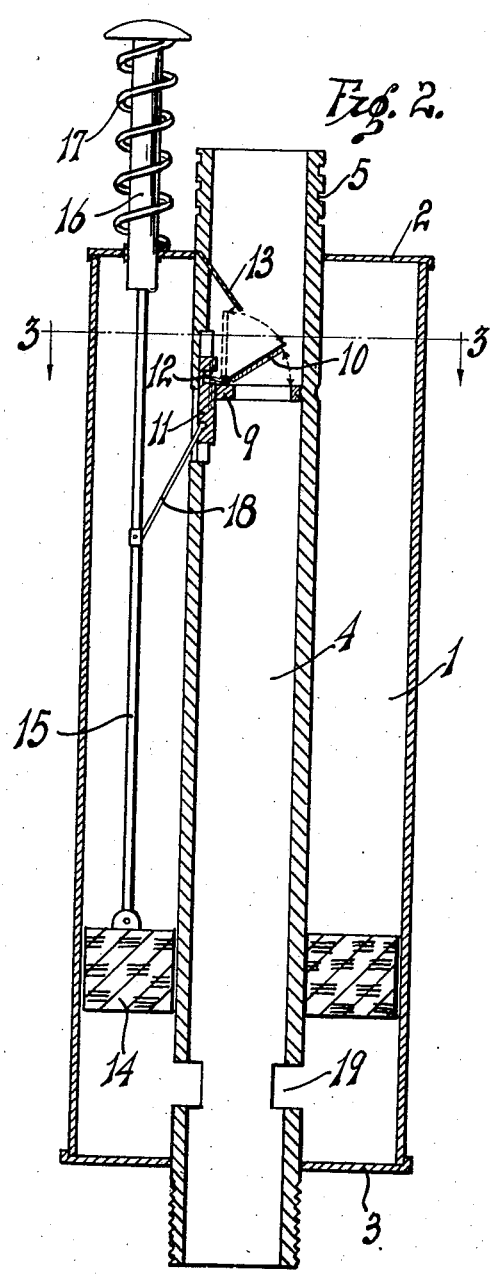
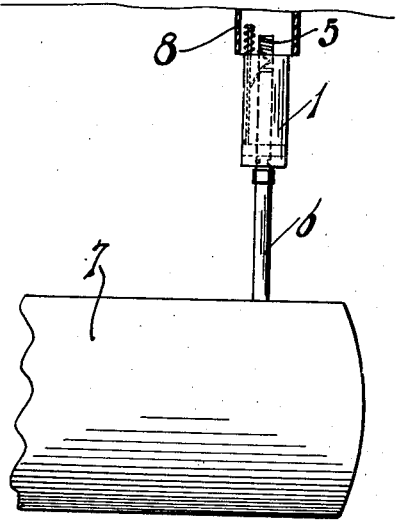
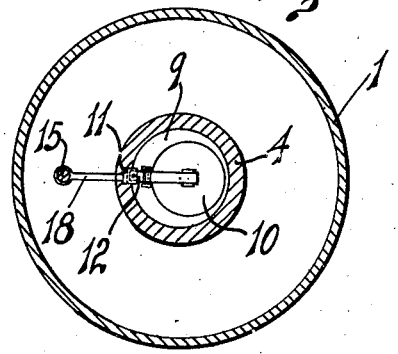
INVENTOR.
ALVIN S. THARP.
BY
ATTORNEY.

UNITED STATES PATENT OFFICE 2,299,360

SHUTOFF VALVE FOR STORAGE TANKS

Alvin S. Tharp, Long Beach, Calif.

Application February 10, 1941, Serial No. 378,205

5 Claims. (Cl. 137—104)

This invention relates to a shutoff valve for storage tanks, and particularly tanks in which gasoline and the like are stored, and which are customarily filled from a tank truck, or other storage tank.

An object of my invention is to provide a novel shutoff valve for storage tanks, which is provided with a conduit, through which the measuring stick can be placed in order to gauge the tank. The shutoff valve being so arranged that it will not interfere with the use of the measuring stick.

Another object of my invention is to provide a novel shutoff valve of the character stated, in which the check valve can be manually controlled so as to permit the hose from the tank truck to be drained into the valve housing.

A further object is to provide a novel shutoff valve of the character stated which is simple in construction, inexpensive to manufacture, and effective in operation.

Other object, advantage and features of invention may appear from the accompanying drawing, the subjoined detailed description, and the appended claims.

In the drawing:

Figure 1 is a fragmentary side elevation of a tank with my shutoff valve mounted thereon.

Figure 2 is a longitudinal sectional view of my shutoff valve.

Figure 3 is a sectional view taken on line 3—3 of Figure 2, but with the valve in closed position.

Referring more particularly to the drawing, the numeral 1 indicates an outer housing, preferably cylindrical in form. This housing is closed at the top and bottom by heads 2 and 3, respectively. A central conduit or pipe 4 extends through the heads 2 and 3, and projects beyond these heads, substantially as shown. At the upper end the pipe 4 is provided with a suitable quick attachment threads 5 to which the hose from the tank truck is attached. The lower end of the pipe 4 is coupled to the pipe 6, which extends into the underground storage tank 7. The shutoff valve may be mounted in or immediately below the usual surface box 8, which is customarily employed in service stations, and the like.

A seat 9 is mounted in the pipe 4 adjacent the upper end of this pipe, and a flap valve 10 cooperates with the seat to close the pipe 4 when the flap valve is resting on the seat, as is evident from the drawing.

The valve 10 may be hingedly mounted on the seat, or adjacent to the seat, as desired. A control block 11 is slidably mounted in the seat 9, and also partly in the wall of the pipe 4. This block is slidable vertically, and engages the finger 12 on the valve 10 so that vertical movement of the block will cause the valve 10 to swing into either open or closed position.

A baffle plate 13 extends inwardly from the pipe 4, and is mounted above the valve 10 so that the valve will swing under the baffle plate when in open position, as shown in dotted lines in Figure 2. The fluid pouring into the tank 7 will thus be deflected away from the valve 10 in the open position of this valve, and will thus not tend to close the valve.

A float 14 surrounds the pipe 4, and is mounted within the housing 1. A rod 15 rises from the float, and extends to a hand control pin 16, which is slidably mounted in the head 2. A coil spring 17 surrounds the pipe 16, and this coil spring is so arranged that the float 14 can drop to its lowermost position without compressing the spring. A link 18 extends from the rod 15 to the block 11. Upward movement of the float 14 will thus swing the valve 10 into closed position.

A plurality of slots or openings 19 are provided in the pipe 4 below the float 14. These slots open into the housing 1, and when the tank 7 is full, liquid will flow out of these slots to fill the housing 1, causing the float 14 to rise, and thus swing the valve 10 into closed position. When the valve 10 is closed the flow from the tank truck is stopped, and the operator then shuts off the valve at the truck. The hose from the truck is still filled with fluid, and the hose must be emptied. The operator then pushes the pin 16 downwardly which swings the valve 10 into open position. The fluid in the hose then drains into the housing 1 after which this hose is uncoupled from the top of the pipe 4. When the operator releases the pin 16 the natural action of the float 14 will again close the valve 10. When there is not fluid in the housing 1 the natural weight of the float 14 will cause it to drop downwardly, thus swinging the valve 10 into open position. It will be evident that when the valve 10 is in open position that the pipe 4 is open from end to end, and consequently the gauge stick can be inserted through the pipe, and thence into the tank 7 for the purpose of gauging the fluid level in the tank.

Having described my invention I claim:

1. A shutoff valve for storage tanks, comprising a housing, a head closing each end of the housing, a pipe extending longitudinally through the housing, a flap valve in the pipe, a seat in the pipe upon which the flap valve rests, a vertically slidable block in the pipe, means connecting the block and the valve, whereby vertical movement of the block will actuate the valve, a float in the housing, means connecting the float and the block whereby movement of the float will impart vertical movement to the block, said means being outside of the pipe, said pipe having openings therein communicating with the housing.

2. A shutoff valve for storage tanks, comprising a housing, a head closing each end of the housing, a pipe extending longitudinally through the housing, a flap valve in the pipe, a seat in the pipe upon which the flap valve rests, a vertically slidable block in the pipe, means connecting the block and the valve, whereby vertical movement of the block will actuate the valve, a float in the housing, means extending on the outside of the pipe from the float and thence into the pipe and engaging the block whereby movement of the float will impart vertical movement to the block, said pipe having openings therein communicating with the housing, a portion of said last-mentioned means projecting through the housing whereby movement of said portion will actuate the block to open said valve.

3. A shutoff valve for storage tanks, comprising a housing, a head closing each end of the housing, a pipe extending longitudinally through the housing, a flap valve in the pipe, a seat in the pipe upon which the flap valve rests, a vertically slidable block in the pipe, means connecting the block and the valve, whereby vertical movement of the block will actuate the valve, a float in the housing, a rod rising from the float, a pin on the upper end of the rod, said pin rising above the housing, and a link extending from the rod to the block whereby vertical movement is imparted to the block by vertical movement of the float, said pipe having openings therein within the housing and communicating with said housing through which the housing is filled with fluid.

4. A shutoff valve for storage tanks, comprising a housing, a head closing each end of the housing, a pipe extending longitudinally through the housing, a flap valve in the pipe, a seat in the pipe upon which the flap valve rests, a vertically slidable block in the pipe, means connecting the block and the valve, whereby vertical movement of the block will actuate the valve, a float in the housing, means connecting the float and the block whereby movement of the float will impart vertical movement to the block, said means being outside of the pipe, said pipe having openings therein communicating with the housing, a baffle plate in the pipe arranged above the valve, said baffle plate extending over the valve in the open position of said valve only, said pipe being open from end to end in open position of the valve.

5. A shutoff valve for storage tanks, comprising a housing, a pipe extending longitudinally through the housing, said pipe being open at both ends, a seat in the pipe, a valve mounted above the seat and cooperating therewith, a float in the housing, means extending on the outside of the pipe from the float and thence into the pipe to the valve whereby the valve is closed as the float rises in the housing, said pipe having openings communicating with the housing, a portion of said means extending out of the housing whereby the valve may be manually actuated.

ALVIN S. THARP.